N. Robinson.
8638 X
Plow.
Patented Feb. 13, 1835.
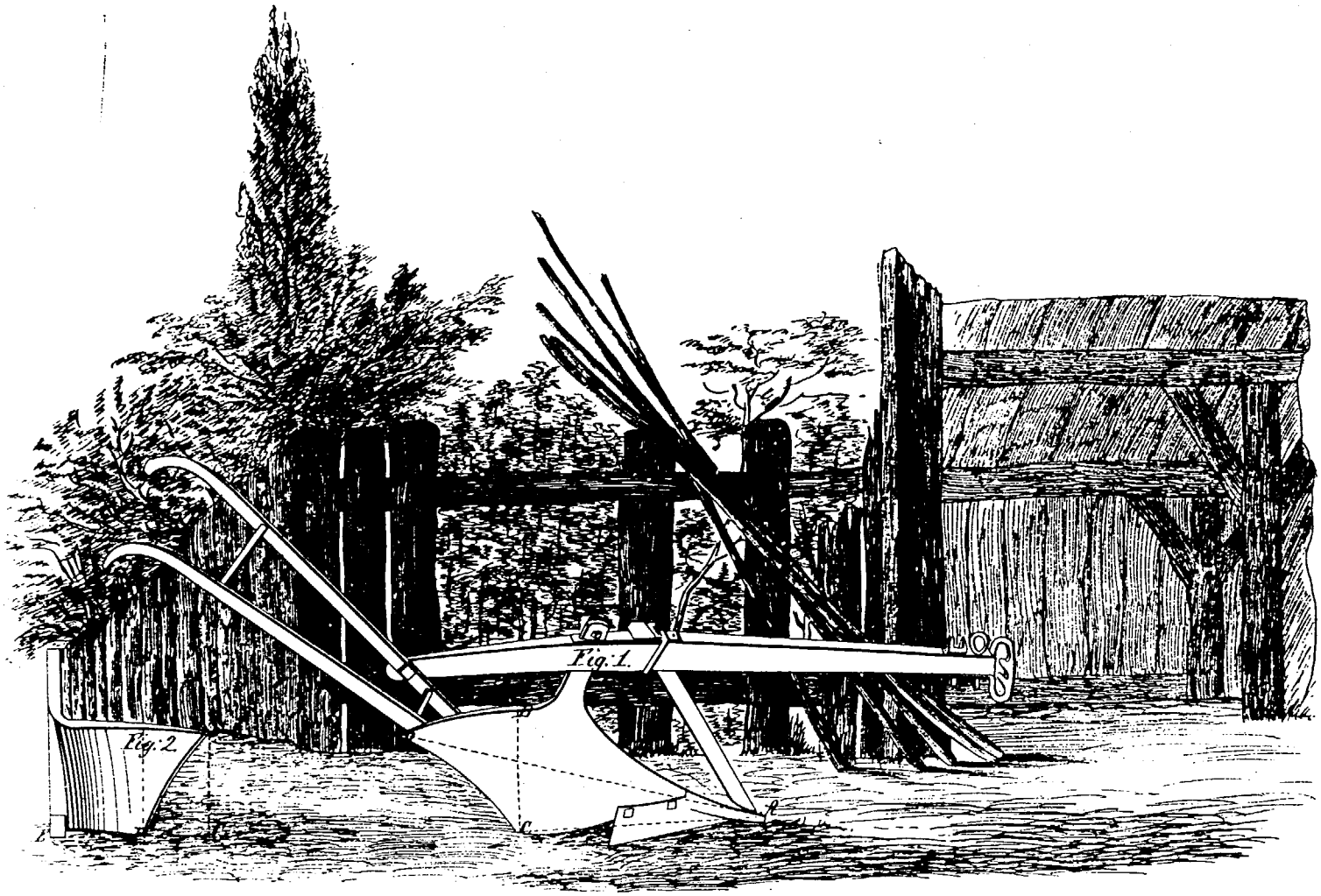

UNITED STATES PATENT OFFICE.

8638X

NATHAN ROBINSON, OF SACKETT'S HARBOR, NEW YORK.

IMPROVEMENT IN PLOWS.

Specification forming part of Letters Patent dated February 13, 1835.

*To all whom it may concern:*

Be it known that I, NATHAN ROBINSON, of Sackett's Harbor, in the State of New York, have invented certain new and useful Improvements in the Mode of Constructing or Forming Plows; and I do hereby declare that the following is a full and exact description thereof.

The body of the plow is best made of cast-iron, as such instruments are now usually made; but the improvements which I have made are independent of the material, consisting of such alterations in its form and relative dimensions as are calculated to obviate the objections most commonly made to the plow now in use—namely, their running hard and their liability to become choked with dirt. The principal alterations I have made in the plow to effect these objects are by giving greater length to the body of it and less curvature to the mold-board than have usually been given.

In describing these improvements I shall set down certain prime measurements and proportions; but it is to be distinctly understood that I do not intend thereby to limit myself in those particulars, but merely to exemplify the principle upon which I proceed, and to give information to those who might otherwise be at some loss in carrying my plan into operation.

From the point or nose of my plow to the junction of the shank or mold-board it is formed to a radius of about seventy-two inches, keeping the same curvature, or nearly the same, through to the hinder part of the mold-board, this being about the medium convexity which the under side of the furrow-slice naturally takes in being raised and turned over. From the commencement of the circle at the point or nose I sweep up till I have raised the share of my plow about ten inches from the bottom of the landside, this being the seat or junction of the stem to the mold-board, presenting a thin flat wedge and a nearly-straight ascending plane of about twenty inches to the earth. At this point the furrow-slice lies on an angle of about thirty-one degrees from the surface of the earth from which it is raised. From the junction of the shank to the mold-board I run back on a straight line about twenty-eight inches, and on an angle of about forty degrees with the landside, making my plow about twenty-one inches wide at the hind part.

My share I proportion in length to the other parts of my plow. Commencing about two inches above the point, I draw a line back, on about the same angle with the landside that the upper edge of the mold-board has, till I have obtained a sufficient width from the landside, which is about twelve inches. The long edge which is thus presented to the furrow-slice separates it readily and evenly from the solid earth. At the termination of my share, which is about sixteen inches from the starting-place at the point, I turn an angle in the lower part of my mold-board in the usual manner; but I carry the bottom edge of the mold-board back even with the bottom edge of the landside, leaving the heel thereof as many inches from the landside as the share is at the widest point. Then these points thus stand at right angles with each other.

The bottom of my plow being about thirty inches long, I make the hind end of my mold-board to slope back sufficiently to give my plow a length of about forty-seven inches from the point or nose to the extreme point of the mold-board.

I will now give some further particulars respecting the relative dimensions of my plow, taken from one which I have made, and the operation of which I have tested by satisfactory experiments. Shim, on an angle of thirty-one degrees with the bottom of the landside. The upper edge of the mold-board is at an angle with the landside, flatwise, forty degrees; the edge of the share with the landside, thirty-two degrees; length of the plow on the bottom of the shank to the points of the mold-board, thirty inches; the edge of the share, seventeen inches; from the termination of the share to the heel of the mold-board, thirteen inches; cutting width at the point of the share, eleven and one-half inches; parting-off width at the bottom, eleven and one-half inches; circle of the shin, seventy-two inches radius; circle of the convexity of the mold-board nearly the same; from the nose to the extreme point of the mold-board, forty-six inches; width of the mold-board, thirteen inches; over jet, seven and one-half inches. It will be manifest to any person that these measurements may be departed from to a certain extent without thereby essentially altering the character of my plow, and it will also be evident to those who are acquainted with the construction of plows in general that the form which I have given to mine, by proportioning the different parts to each other, is such as impresses upon it a character by which it will be readily distinguished from others.

What I claim therefore as my invention is—

A plow formed upon the principles or in the manner herein set forth, by which it is made to run more easily and cleanly than those now in use.

NATHAN ROBINSON.

Witnesses:

SAMUEL GUTHRIC,

SIBYL GUTHRIC.